Sept. 4, 1928.

R. F. MILLS

REATOMIZING DEVICE

Filed July 6, 1923

1,683,089

INVENTOR,
Ray F. Mills,
BY F. K. Farsett,
ATTORNEYS.

Patented Sept. 4, 1928.

1,683,089

UNITED STATES PATENT OFFICE.

RAY F. MILLS, OF WAYNESVILLE, OHIO.

REATOMIZING DEVICE.

Application filed July 6, 1923. Serial No. 649,927.

My invention relates to a device for disposing of certain unconsumed fuel which frequently accumulates on the walls of the intake pipe in a hydro-carbon motor. In commercial gasoline there is considerable heavy fuel which is not easily vaporized, or even atomized. Particles of this heavy fuel gather upon the walls of the fuel intake pipe, and uniting they flow along the walls of the pipe, held there by capillarity, to some point where they accumulate. From time to time comparatively large quantities or globules of this fuel are caught up by the current of gas flowing through the intake pipe and carried to the motor cylinder. The globules are too large to burn, or if they do burn it is very imperfectly, this imperfect combustion producing large quantities of carbon in the cylinder, as well as causing trouble in other ways. Therefore, in addition to a waste of fuel, which is considerable, the condition brought about by this cause is very objectionable.

One object of my invention is to provide a suitable receptacle for this strayed fuel, in which the fuel may accumulate without liability of its being carried back into the gas current in globules, and another object is to atomize this fuel and reintroduce it into the current of gas which is passing through the pipe.

Figure 1:
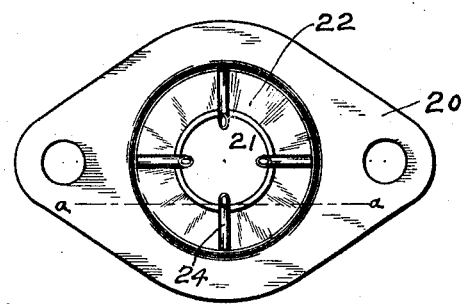
Figure 2:
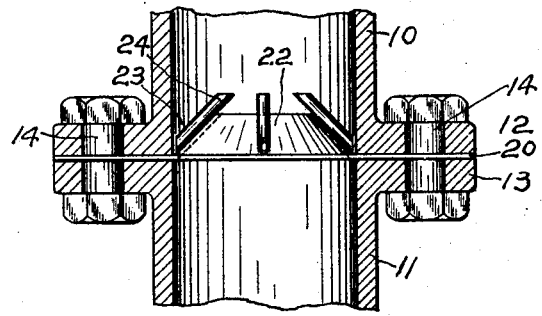

I shall now describe my invention, referring to the accompanying drawing, in which Fig. 1 is a plan view of the device by which I effect the objects referred to, and Fig. 2 is a fragmental view of the fuel intake pipe of a hydro-carbon motor, with the device shown in Fig. 1 applied.

Referring first to Fig. 2, parts 10 and 11 are provided with flanges 12 and 13, which are clamped together with bolts 14. The member 10 may be part of the motor manifold, and the member 11 part of the carburetor. As this is a common arrangement it may be considered so in the present case, or both parts might belong to what would be called the manifold. This is immaterial, however, and it will be sufficient to consider the members 10 and 11 as combining to form a part of the fuel intake pipe. Between the flanges 12 and 13 I clamp the gasket 20, shown in Fig. 1, having a hole 21 in its center. The annular area surrounding this hole is pressed upward to form a frustrum of a cone, 22. The diameter of the base of this frustrum is preferably about equal to the interior diameter of the pipe 10, so that when the gasket is clamped between the members 10 and 11, there is formed around the frustrum an annular basin 23, in which fuel that runs down the wall of the pipe 10, may accumulate. I secure a plurality of tubes 24 to the sides of the frustrum, the lower ends of the tubes extending to the base, while the upper ends extend some distance above the upper edge of the frustrum. This hollow conical frustrum forms a choke in the pipe, and since the upper ends of the tubes 24 extend into the path of the gas which passes through the aperture 21, the tubes are subject to the action produced by the choke. Thus a suction is created which draws the fuel from the basin 23 through the tubes. The fuel is atomized as it emerges from the tubes, and thus the fuel is carried to the cylinder in a condition suitable for combustion.

In Fig. 2 the pipe is shown as vertical, but my device is applicable to a horizontal pipe, or even one which lies at an angle. In order to appreciate this, suppose Fig. 2 be regarded as a plan view instead of an elevation, in which case the gasket 20 would be in the position which it occupies in Fig. 1; i. e., vertical. The dotted line $a$—$a$ in Fig. 1 indicates the level to which fuel might accumulate in the basin 23, which basin would no longer be annular, and the duty of drawing the fuel from this basin would fall upon the lowermost tube 24, the other tubes then being idle. One tube 24 is capable of performing this service, however, and thus it is seen that my device might be used in either a vertical or horizontal fuel pipe. This being so, it is evident that it can be employed in a pipe which is neither vertical or horizontal, with equal success.

I am aware that means have been devised for retrieving strayed fuel, but I know of no previous attempt to lift this fuel by suction from one level to a higher level, nor to atomize the retrieved fuel. My device effects a very substantial saving of fuel, possibly as much as 5% or 10%. But its usefulness is not limited to fuel saving, as it contributes very substantially toward improved motor performance and reduction of carbon formation in the motor cylinder. As the content of heavy fuel in commercial gasoline is gradually increasing, my device will become more and more useful as time goes on.

What I claim as my invention is as follows:

1. A reatomizing device, comprising an intake pipe of a hydro-carbon motor, a member to be inserted therein, said member having a portion frustro-conical in form, traversed by a frustro-conical passage through which the gases in the pipe pass; said conical portion being adapted to cooperate with the wall of the pipe in forming an annular basin in which unconsumed fuel flowing down along the wall of the pipe may accumulate; a tube secured to the outer wall of said conical portion, in such a position that one end will be in said basin and the other end in the path of the gas which emerges from the small end of said opening, and means for securing said member in the pipe.

2. In a fuel intake pipe for a hydro-carbon motor, a reatomizing device, comprising a coupling for uniting two parts of said pipe, comprising a flange on each of said parts and bolts for clamping said flanges together; a gasket to place between said flanges, having a circular central aperture smaller than the inner diameter of the pipe, the portion of the gasket surrounding the aperture being pressed upward to form a frustro-conical protuberance, having a base approximately the diameter of the pipe, and a tube secured to the outside of said conical protuberance, with one end near the base and the other end extending past the upper edge of the frustrum.

3. In a reatomizing device for a hydro-carbon motor, a gasket to place between two flanges by which sections of the fuel intake pipe are connected, said gasket comprising a piece of sheet metal having a hole in its center and the annular area around the hole pressed upward to form a frustrum of a cone, and a plurality of tubes secured to the side of said frustrum, with their lower ends at the base and their upper ends extending above the upper edge of the frustrum.

RAY F. MILLS.